Figure 1:
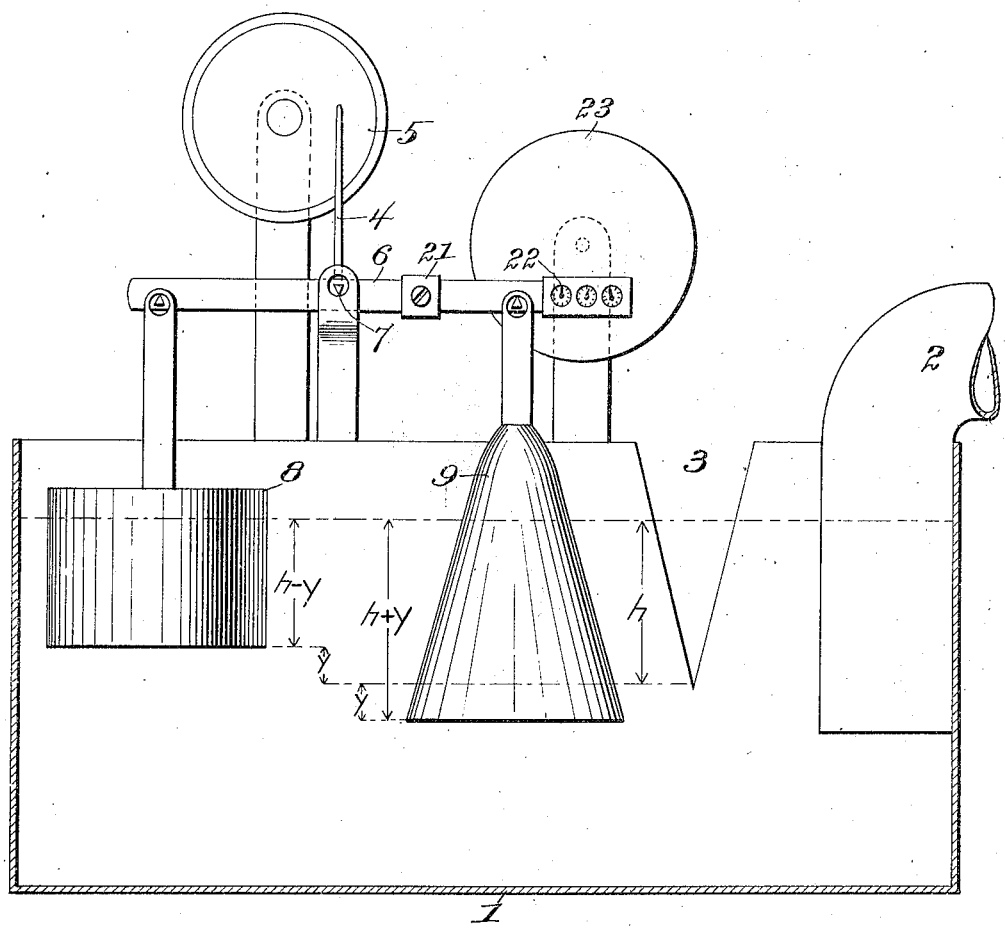

E. G. BAILEY.
LIQUID METER.
APPLICATION FILED SEPT. 8, 1914.

1,243,683.

Patented Oct. 23, 1917.
2 SHEETS—SHEET 1.

E. G. BAILEY.
LIQUID METER.
APPLICATION FILED SEPT. 8, 1914.

1,243,683.

Patented Oct. 23, 1917
2 SHEETS—SHEET 2.

Witnesses:
Jas. J. Maloney
E. M. Simpson

Inventor:
Ervin G. Bailey
by H. J. Livermore
Atty

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

LIQUID-METER.

1,243,683.  Specification of Letters Patent.  Patented Oct. 23, 1917.

Application filed September 3, 1914.  Serial No. 860,797.

*To all whom it may concern:*

Be it known that I, ERVIN G. BAILEY, a citizen of the United States, residing in Newton Highlands, in the county of Middlesex and State of Massachusetts, have invented an Improvement in Liquid-Meters, of which the following description, in connection with the accompanying drawings, is a specification, like letters on the drawings representing like parts.

The present invention relates to a liquid meter which is particularly adapted for use in measuring the rate of flow of liquids through weir notches, orifices and other such apertures which have a restricted discharge and in which the rate of flow of the liquid varies in a known relation to the level of the surface of the liquid on the upstream side of the aperture.

The invention is embodied in an instrument which is adapted to respond in its action to changes in the level of a liquid, and which, in cases in which the factor to be measured is not directly proportional to the change in level, is also adapted to integrate the reading automatically without the intervention of any complicated mechanism between the parts which are directly acted upon by the rise and fall of the liquid and the parts which indicate the final result.

In the meter embodying the present invention the indicating, recording or integrating device is made to move in any desired relation to the changes in the level of the liquid without using mechanical devices, such as cams, gears or the like, so that the instrument is substantially frictionless in its operation. Furthermore, the instrument is also capable of automatically and accurately correcting for changes in density of the liquid at all rates of flow.

The instrument is provided with a container for liquid, and two displacing members extending into the liquid and pivotally connected to a beam, by means of rigid connectors, so that the weights of the two displacing members produce opposing moments of force about a common axis. The relative moment arms, and horizontal cross sectional areas of the displacing members at the surface of the liquid are such that changes in the level of the liquid tend to produce unequal changes in moment effect due to buoyancy of the liquid upon the two displacing members. The moments are eventually equalized in response to motion of the displacing members so that one displacing member becomes more deeply submerged than the other, for equal or proportional volumes of submersion. By properly shaping one displacing member with respect to the other, relative motions of the displacing members can be made to be directly proportional to the rate of flow of liquid through any aperture, such as a V-notch. Rigid connectors are employed to connect the beam with the displacing members since it is very important that there should be no variation in the vertical distance between the beam and the displacing members. The simplest form of the device will automatically correct for changes in density of the liquid and give results directly proportional to the actual volume of liquid flowing. By having one displacing member suitably shaped and in a communicating vessel in which the liquid is maintained at a substantially constant density, the instrument will automatically correct for changes in density and show substantially correct results on a weight basis.

There are many modifications of the present invention which may be used for various purposes and I have selected only a few for the purpose of illustration.

Figure 2:
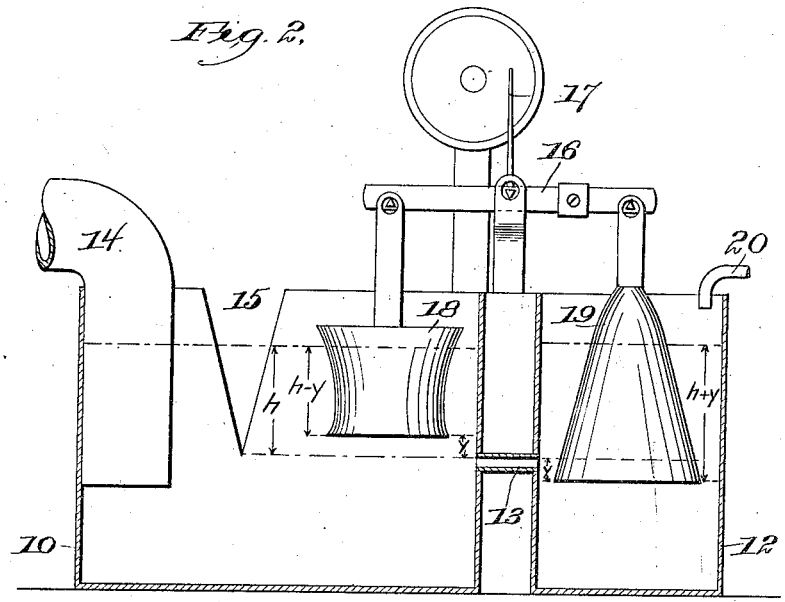
Figure 3:
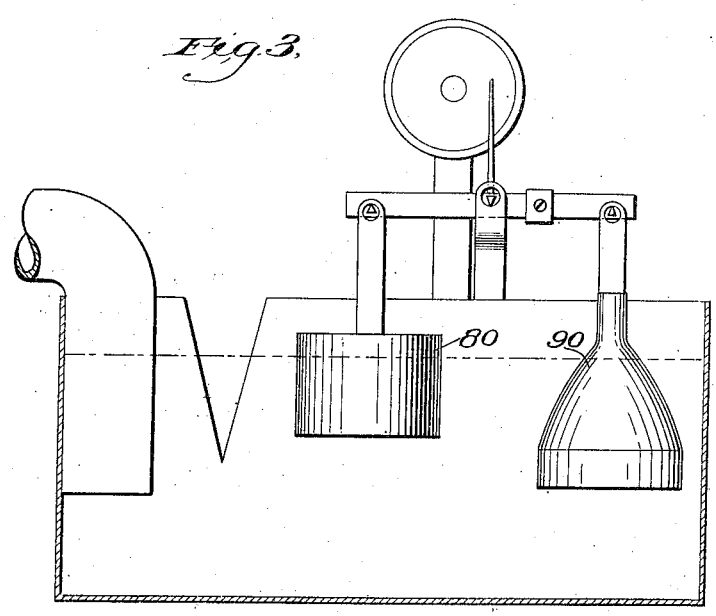

Figure 1 is a side elevation of a liquid meter embodying the invention with the liquid receptacle shown in vertical section; and Figs. 2 and 3 are similar views showing modifications.

Referring to Fig. 1, the instrument embodying the invention consists of the tank or receptacle 1, shown as provided with the intake pipe 2 and the V-notch 3. The indicator 4 which is shown as a pen adapted to travel over a chart 5 for recording purposes is connected with a beam 6 which is pivotally supported on knife-edge bearings at 7 over the obstructed liquid. In order to actuate the indicator, the beam is provided with two knife edge bearings at opposite sides of its axis on which bearings are hung by rigid connectors two displacing members which extend into the liquid, and are so constructed as to have a density equal to or greater than that of the liquid, the said displacing members tending to rise or fall as the level of the liquid varies. In accordance with the invention the moments of force with which the displacing members act on the beam are caused to vary with relation to each other as the liquid level varies, in any desired relation, so that the movement of the indicator instead of being directly proportional to the change in level, is in such proportion as may be necessary to express the rate of flow indicated by the level, the weight or quantity of the liquid at different rates of flow at different levels, or any other desired factor which varies with the change in level, but is not directly proportional thereto.

This is accomplished, in accordance with the invention, by so shaping one or both displacing members that the horizontal sectional area thereof varies, thereby varying the actual buoyant effect at different degrees of submersion. The buoyancy of one displacing member, therefore, will become, as the liquid level changes, greater than that of the other causing a difference between the moments of force through which they act, and a consequent movement of the beam.

The invention may be more clearly explained by following out the operation.

Referring for example, to Fig. 1 in which the instrument is arranged to indicate the rate of flow of liquid through a V-notch weir the displacing member 8 is shown as of larger cross-sectional area than the displacing member 9, it being obvious therefore that as the liquid rises, the displacing member 9 must be deeper in the liquid than the displacing member 8 in order that the submerged volumes may be equal and balanced. Since, therefore, the two displacing members are suspended from the beam as shown, the displacing member 9 will be moved downward with relation to the displacing member 8 as the liquid rises thereby causing a movement of the beam.

If the displacing member 9 were uniform in cross-sectional area but smaller than the displacing member 8 the resulting movement would be directly proportional to changes in the level of the liquid. By making, however, one at least of the displacing members of variable horizontal cross-sectional area the final action on the indicator can be modified to suit the conditions desired such, for example, as causing the indicator to move in proportion to the rate of flow of liquid through a V-notch weir where the rate of flow varies substantially as the $\frac{5}{2}$ power of the head. In this case the mathematical calculation whereby the shape of the displacing member 9 is determined is as follows:

Let
$h$ = head, or height of the surface of liquid above the bottom of the V-notch.
$y$ = the upward motion of displacing member 8 (and the downward motion of displacing member 9, when the two moment arms are equal) corresponding to said head, $h$.
$A$ = horizontal sectional area of displacing member 8 at the surface of the liquid.
$a$ = horizontal sectional area of displacing member 9 at the surface of the liquid.
$k$ = constant involving the ratio between the motion of the displacing member and the rate of flow, angle of the V-notch, etc.

Then to meet the above requirements in view of the law of flow of liquid through a V-notch we have equation:

(1) $y = kh^{\frac{5}{2}}$ the differentiation of equation (1) gives (2) $dy = \frac{5}{2}kh^{\frac{3}{2}}dh$ The displaced volumes of the two displacing members must be equal in order to maintain equilibrium of moments, hence equation:

(3) $A(dh - dy) = a(dh + dy)$

By combining equations (2) and (3) we have:

(4) $a = \dfrac{A\left(1 - \frac{5}{2}kh^{\frac{3}{2}}\right)}{1 + \frac{5}{2}kh^{\frac{3}{2}}}$ By assuming numerical values for $A$, $k$ and $h$ the values of $y$ and $a$ may be readily determined by means of equations (1) and (4) and the areas of the displacing member 9 may be plotted, the altitude of the various points being $h + y$. The displacing member 8 may be of any desired shape, and for convenience in construction let $A$ be constant and the displacing member 8 be cylindrical. The shape of the displacing member 9 is then approximately as shown in the drawing. It is necessary to modify the shape slightly from that called for by the above equations in order to satisfy the slight change in the coefficient of discharge of the V-notch at different heads. The displacing member 9 could be made cylindrical and the shape of the displacing member 8 calculated from equation (4) equally well, or either displacing member may be assumed to be any shape whatever, such for example as conical; and the shape of the other displacing member calculated in a similar manner.

In the foregoing and following calculations the vertical motion only of the displacing member has been considered and not the arc; and if the recorder moves through equal angles and the chart graduations are equally spaced along the chord of the arc over which the pen travels, the correct result will be secured. If the recorder or integrator is given a straight line motion suitable allowance should be made in the calculation.

It is readily observed that the relative motion of the displacing members is dependent solely upon the height of the surface of the liquid, and is entirely independent of the density of the liquid. The fundamental law of flow of fluids is based upon volume of discharge and head as measured in actual vertical height of the flowing liquid, so that the instrument shown in Fig. 1 is capable of automatically giving a correct reading in terms of volume discharged regardless of any change in density of the liquid.

It is obvious that similar displacing members may be calculated to give an indicator motion in direct proportion to the rate of flow of liquid through any other aperture such as a rectangular weir, orifice, or even a specially designed aperture that would result in a rate of flow in direct proportion to the head. In calculating the shapes of such displacing members it is only necessary to substitute the law governing the relation between rate of flow and head as in equation (1) and the shape of either displacing member may be arbitrarily assumed, such for instance as cylindrical, and the shape of the other determined by calculation. In the case of a specially designed aperture which gives a rate of flow directly proportional to the head both displacing members could be cylindrical, one larger than the other. It is not necessary that the moment arms should be of equal length in any case, but they have been assumed to be equal in the foregoing calculations for convenience.

The instrument is also shown as provided with a weight 21 for the purpose of balancing the mechanism, and also an integrating mechanism 22 adapted to be in frictional contact with a clock driven disk 23.

If it is desired to indicate the rate of flow of liquid through the notch in terms of weight instead of volume, it is necessary to provide the instrument with means for modifying the reading to bring about the desired result.

In Fig. 2 I have shown an instrument adapted to meet these requirements.

Referring to the said Fig. 2, the instrument is provided with two separate tanks 10 and 12 connected together by means of a small duct 13 below the surface of the liquid, the tank 10 being adapted to receive the liquid which is to be metered, and being directly behind the obstruction. The said tank is provided with inlet pipe 14 and the weir notch 15. The tank 12 is adapted to contain a liquid of substantially constant density, it being assumed that the liquid to be measured is of variable density. In this instrument, the beam 16 which varies the indicator 17 is pivoted over the tanks 10 and 12 at a point between them, and the displacing members 18 and 19 extend respectively from the opposite ends of the beam into the liquids contained in the tanks 10 and 12.

In the case of a water meter where changes in density are caused almost entirely by changes in temperature, the compartment 12 may be heated or cooled to a constant temperature, or if located in a room of substantially constant temperature it may be maintained at practically a constant temperature since there is very little change in the liquid in compartment 12, owing to the fact that displacing member 19 becomes more deeply submerged as the liquid level rises, and vice versa. A supply of liquid of constant density may be continually added to the compartment 12, from a pipe 20 at a very low rate and discharge through the duct 13 to the other compartment.

It is impossible to make an absolutely correct solution of the shapes of the displacing members that will accomplish the desired end with exact mathematical precision under all conditions of rate of flow and density owing to the fact that these factors are independently variable; but by assuming one factor as a constant in a part of the calculation and later assuming another factor to be a constant, a very close approximation of the desired end can be obtained owing to the fact that the absolute shape of one displacing member and the relative shape of the other admit of a wide latitude in the design. The following mathematical calculation although not absolutely correct serves to illustrate the principle involved, and is sufficiently exact for all practical purposes. Let the same symbols represent the same factors, and include the additional factor of the ratio of densities of the liquid in tank 12 to that in tank 10, denoted as $r$.

Then if $y$, or the motion of the displacing members is to be proportional to the weight of the liquid passing through a V-notch;

$$(5) \quad y = rkh^{\frac{5}{2}}$$

and the differentiation of equation (5) is:

$$(6) \quad dy = \frac{5}{2}rkh^{\frac{3}{2}}dh + kh^{\frac{5}{2}}dr$$

Assuming the two moment arms to be equal, then the displaced volumes of liquids are inversely proportional to the densities of the two liquids, and $$(7) \quad rA(dh-dy) = a(rdh+dy)$$

combining (6) and (7)

$$(8) \quad a = \frac{A\left(rdh - \frac{5}{2}r^2kh^{\frac{3}{2}}dh - krh^{\frac{5}{2}}dr\right)}{rdh + \frac{5}{2}rkh^{\frac{3}{2}}dh + kh^{\frac{5}{2}}dr}$$

It is noted that this equation is of the same form as (4) the principal difference being the $r$ in the second term of the numerator. If $r$ were constant, A could vary in any desired manner and so long as the given relation existed between $a$ and A the desired motion of the displacing members would be secured. But $r$ may be variable and independent of the three other variables $h$, $a$, and A of equation (8) so that a theoretically correct numerical solution cannot be readily obtained. Regardless of how A varies with $h$ and $r$ it can be assumed as a special case that both $h$ and $r$ vary in such a manner that the displacing member 18 maintains the same depth of submersion, and then A and $h-y$ would have constant values. By assuming different values for $h$ it is possible to calculate $r$ and $y$ and also $a$, so that $y$ will be directly proportional to the weight of liquid flowing. By selecting a value for the constant $c$ which equals $h-y$ such that the displacing member 18 is well submerged, the variation in $r$ can be made so great as to calculate the required shape of the displacing member 19 throughout its entire working length.

If $c=h-y$ as stated above then from equation (5) $c=h-rkh^{\frac{5}{2}}$ and by transposing we have:

$$(9) \quad r = \frac{h-c}{kh^{\frac{5}{2}}}$$

then by combining equation (8) and (9) we have $$(10) \quad a = \frac{A\left(1 - \frac{5}{2}kh^{\frac{3}{2}}\frac{h-c}{kh^{\frac{5}{2}}}\right)}{1 + \frac{5}{2}kh^{\frac{3}{2}}}$$

and by assigning suitable constant numerical values to A, $c$, and $k$, and assuming various values to $h$, $a$ can be determined from equation (10) also the corresponding values of $r$ and $y$ from equations (9) and (5) and then knowing $a$ and $rh+y$ the shape of the displacing member 19 is fixed. The corresponding shape of float 18 can then be calculated by transposing equation (8) to read:

$$(11) \quad A = \frac{a\left(1 + \frac{5}{2}kh^{\frac{3}{2}}\right)}{1 - \frac{5}{2}rkh^{\frac{3}{2}}}$$

and assuming different values for $h$ and $r$, and taking the corresponding values for $y$ and also $a$ as previously determined. The shapes of both displacing members are therefore fixed and it has been found that with such a device all conditions are practically complied with, so that the indicator motion is substantially in direct proportion at all times to the weight of a liquid of any density flowing at any rate of flow.

It is obvious that the present invention need not be confined to giving an indicator motion directly proportional to the rate of flow, but it can be equally well used where is is required that the motion of the indicator should be in any desired relation to the rate of flow.

It is evident from the foregoing description that the present invention may have similar application for many useful purposes and it is not limited to the specific purposes that I have chosen for the purpose of illustrating the character and purpose of the invention.

What I claim is:—

1. A liquid meter comprising an obstruction for the liquid to be measured, said obstruction having a weir-notch; two displacing members both of which extend into the obstructed liquid; a pivotally supported beam having an indicator; and rigid connectors for connecting said displacing members with said beam at opposite sides of the axis of said beam respectively, the horizontal cross-sectional areas of said displacing members being such as to give the said indicator a movement directly proportional to the rate of flow of liquid through said weir notch.

2. A liquid meter comprising an obstruction for the liquid to be measured, said obstruction having a weir-notch; two displacing members both of which extend into the obstructed liquid, one of said displacing members having varying horizontal cross-sectional areas; a pivotally supported beam having an indicator, said beam being suspended on a knife edge bearing over the obstructed liquid; rigid connectors connected with said displacing members respectively; and knife edge bearings on the beam at opposite sides of the axis thereof for said connectors respectively.

3. A liquid meter comprising an obstruction for the liquid to be measured provided with means for permitting a restricted flow thereof past said obstruction; two displacing members both extending into the obstructed liquid; a beam pivotally supported over said liquid; and rigid connectors for connecting the said beam at opposite sides of its axis with said displacing members respectively, the cross-sectional areas of the displacing members at the surface of the liquid being variable with relation to each other.

4. A liquid meter comprising an obstruction for the liquid to be measured provided with means for permitting a restricted flow thereof past said obstruction; two displacing members both extending into the obstructed liquid; a beam pivotally supported over said liquid; and rigid connectors connecting the said beam at opposite sides of its axis with said displacing members respectively, the horizontal cross-sectional areas of the displacing members being such that the change in buoyant effect of the said liquid on said displacing members will vary with relation to that of the liquid on the other.

5. A liquid meter comprising an obstruction for the liquid to be measured, provided with means for permitting a restricted flow thereof past said obstruction; two displacing members both extending into the obstructed liquid; a beam pivotally supported over said liquid; and rigid connectors for connecting the said beam at opposite sides of its axis with said displacing members respectively, the horizontal cross-sectional areas of said displacing members being unequal at the surface of the liquid.

6. A liquid meter comprising an obstruction having an aperture for the egress of liquid; a tank located behind said obstruction to receive the liquid to be measured; a second tank containing a liquid of substantially constant density which second tank is connected below the level of the liquid with the tank first named, the liquid in both tanks being subjected to substantially the same surface pressure; an indicating member pivotally supported over said tanks; a displacing member connected to said indicating member and extending into the body of liquid in one of said tanks; a second displacing member also connected to said indicating member and extending into the liquid in the other tank; and means whereby the effective action on one of said displacing members varies with change of level of the liquid.

7. A liquid meter comprising an obstruction to the flow of liquid provided with an aperture for egress of liquid past said obstruction; a second tank containing a liquid of substantially constant density; means whereby the height of the level of the liquid in the second tank and height of the level of the liquid governed by the obstruction are inversely proportional to their respective densities; a pivotally supported indicating member; a displacing member connected to said indicating member and extending into the body of the liquid governed by the obstruction; and a second displacing member also connected to said pivotally supported indicating member and extending into the liquid in said second tank; and means whereby the buoyant effect of the liquid on said displacing members varies as the level of the liquid varies.

In testimony whereof, I have signed my name to this specification in the presence of two subscribing witnesses.

ERVIN G. BAILEY.

Witnesses:
H. J. LIVERMORE,
JAS. J. MALONEY.